United States Patent

[11] 3,628,446

[72] Inventor Stephen Joseph Raiteri
     617 Webbs Hill Road, Stamford, Conn. 06903
[21] Appl. No. 826,227
[22] Filed May 20, 1969
[45] Patented Dec. 21, 1971

[54] COMBINATION COFFEE MAKER AND TEAKETTLE
     12 Claims, 5 Drawing Figs.
[52] U.S. Cl. .................................................. 99/305, 99/306
[51] Int. Cl. ..................................................... A47j 31/10
[50] Field of Search ............................................. 99/304, 305, 306, 300

[56] References Cited
UNITED STATES PATENTS

| | | | |
|---|---|---|---|
| 1,954,551 | 4/1934 | Wilcox | 99/305 |
| 2,245,389 | 6/1941 | Cremer | 99/305 |
| 3,333,528 | 8/1967 | Bender | 99/305 |

FOREIGN PATENTS

| | | | |
|---|---|---|---|
| 935,569 | 7/1956 | Germany | 99/305 |

Primary Examiner—Robert W. Jenkins
Attorney—Wooster, Davis and Cifelli

ABSTRACT: There is disclosed a coffee maker which includes a coffeepot and a filter assembly for retaining ground coffee. An electrically heated teakettle is positioned atop the filter assembly and includes a valve which may be actuated to release a controlled amount of hot water into the filter assembly. This combination forms a drip coffee maker, the brewed coffee being retained in the pot. The teakettle may thereafter be removed and the remaining water used for brewing tea.

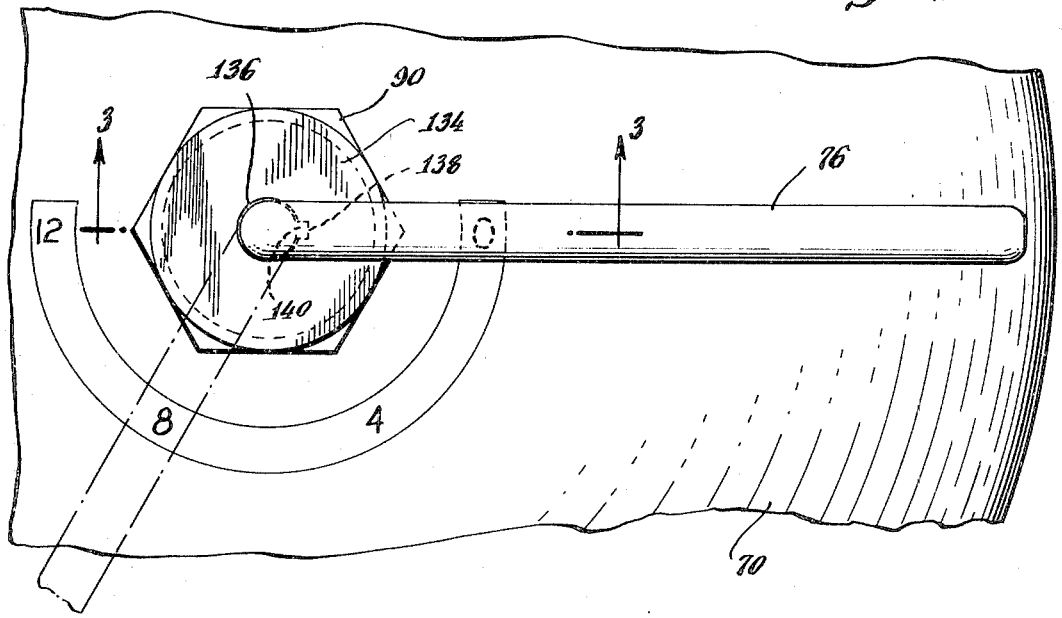
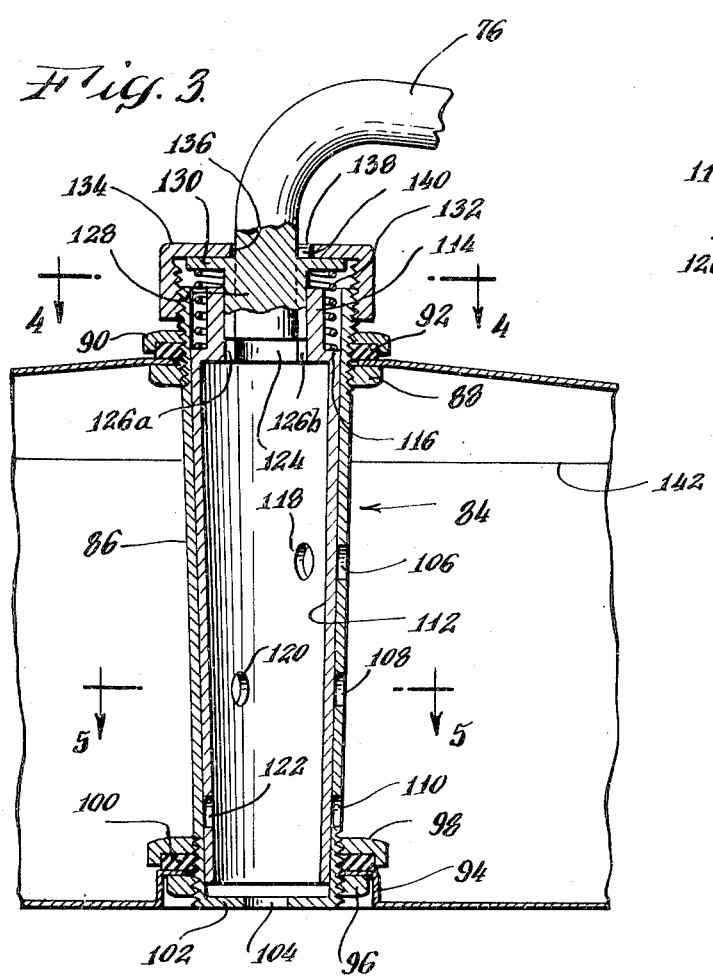
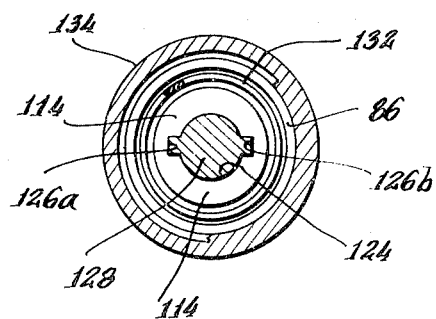
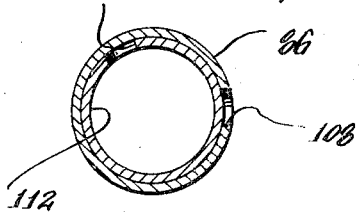

3,628,446

COMBINATION COFFEE MAKER AND TEAKETTLE

BACKGROUND OF THE INVENTION

This invention relates to a drip coffee maker and, more particularly, to such a coffee maker designed primarily for home use and incorporating a teakettle for use in making tea.

It is well known that the best coffee is made by the drip brewing process. Drip brewing has the advantage of permitting the water to pass through the ground coffee only once and remaining in contact therewith for a limited period of time. This prevents the bitterness often found in coffee made by other processes, such as percolation, wherein the coffee is continuously recirculated. It also has the advantage of making a clearer brew because the filter bed formed by the coffee grounds remains unbroken in contrast to that of the well-known vacuum coffee maker. For these reasons, the drip method is widely used in commercial coffee urns. It is less widely used, however, in domestic coffee makers because it requires the additional steps of first heating water separately and then pouring it into the coffee maker. Commercial coffee urns customarily include a separate reservoir of hot water which may be used for making tea. It would be desirable to provide a similar arrangement in a small domestic coffee maker.

Accordingly, it is the primary object of this invention to provide a domestic coffee maker combining the advantages of drip brewing with a ready reservoir of hot water. The manner in which this and other objects are achieved will be apparent from the following description and appended claims.

SUMMARY OF THE INVENTION

This invention is a combination coffee maker and teakettle comprising a receptacle for brewed coffee and filter means positionable atop the receptacle for supporting ground coffee therein. A teakettle is positionable atop the filter and includes a valve for releasing into the filter a preselected quantity of hot water.

BRIEF DESCRIPTION OF THE DRAWINGS

For a better understanding of this invention, reference may be had to the drawings wherein:

FIG. 2 is a partial top view on an enlarged scale of the device shown in FIG. 1;

FIG. 3 is a cross section taken substantially along the line 3—3 of FIG. 2 showing the teakettle valve construction;

FIG. 4 is a cross section taken substantially along the line 4—4 of FIG. 3; and

FIG. 5 is a cross section taken substantially along the line 5—5 of FIG. 3.

DESCRIPTION OF THE PREFERRED EMBODIMENT

Figure 1:
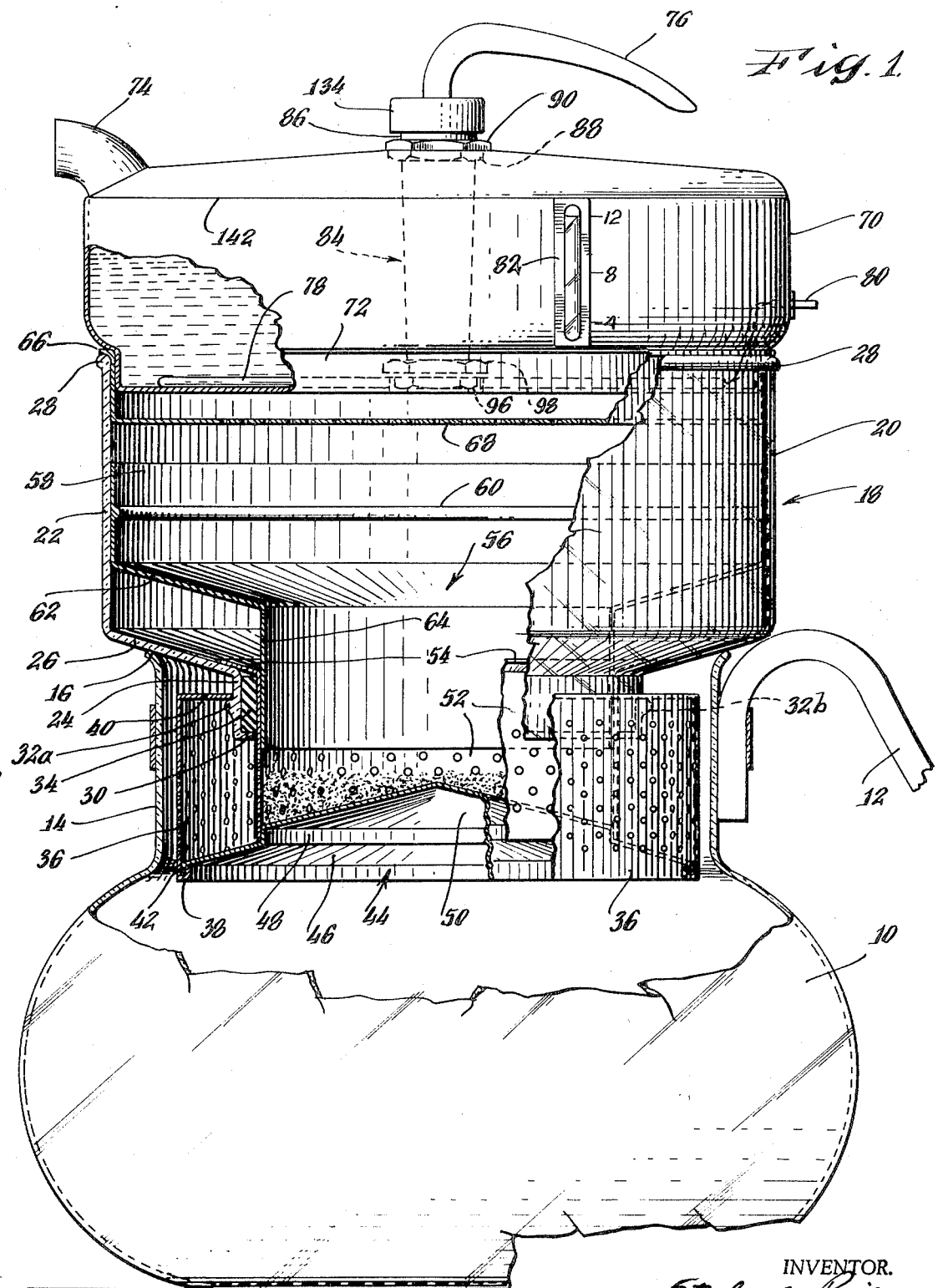
FIG. 1 is a side view of the combination coffee maker and teakettle of this invention, partially broken away to illustrate its internal construction.

With particular reference to FIG. 1 there is illustrated an embodiment of this invention comprising a coffeepot 10 having a handle 12. This pot is of substantially standard configuration and may be made, for example, of a heat-resistant glass. It includes a narrowed neck 14 terminating in a rim 16. Positioned atop the rim 16 and extending into neck 14 is a filter assembly 18. The filter assembly 18 includes a housing 20 having a cylindrical upper portion 22 of greater diameter than rim 16 and a cylindrical lower portion 24 of a lesser diameter than rim 16, the two portions being interconnected by an inwardly extending conical shelf 26. The open end of upper portion 22 is surrounded by a bead 28 and the lower portion terminates in a narrow inwardly extending flange 30. Molded on the outer surface of the lower portion 24 are a pair of diametrically opposed bumps 32a, 32b. The flange 30 supports a neoprene ring gasket 34 which extends around the inner surface of the lower portion 24.

Suspended from the housing 20 is a fine filter 36 and base 38 assembly. The fine filter 36 is substantially cylindrical and includes an inwardly extending flange 40 at its upper end. The flange 40 defines a circular opening substantially equal to the outer diameter of lower portion 24 of housing 20 with the exception of two diametrically opposed notches for receiving the bumps 32a, 32b during assembly. After assembly, a slight rotation secures the fine filter to the housing 20. The lower edge of the fine filter is turned inwardly and upwardly and pressed against the depending flange 42 of a conical base 44. The base 44 includes a lower conical portion 46 which extends inwardly to a vertical step 48 and an upper conical portion 50 which terminates at an apex. A substantially cylindrical coarse filter 52 is positioned with its lower edge encircling step 48 and its upper portion resiliently engaged by gasket 34. At its upper end it terminates in an outwardly extending conical flange 54 which rests upon the conical shelf 26 of housing 20.

In order to control the rate of water flow to provide optimum results for differing quantities of coffee, there is provided an adjustable slide valve 56. The slide valve 56 includes a substantially cylindrical upper portion 58 which slidingly engages the upper portion 22 of the housing 20. A circular bead 60 is formed on the inner surface of upper portion 58 to provide a finger grip for manual adjustment. An inwardly extending conical shoulder 62 terminates in a downwardly extending cylindrical neck 64 which may be positioned to obstruct some of the openings in coarse filter 52 to thereby restrict the flow of water. It should be pointed out that the size of the openings in filters 36 and 52 is greatly exaggerated in the drawing for illustrative purposes. Their actual size is comparable to that found in conventional coffee makers. Suspended from the top of housing 20 by means of a flange 66 is a water distributor comprising a circular perforated water-distributing plate 68.

Mounted atop the housing 20 and distributor plate 68 is the teakettle 70 portion of this invention. The diameter of the teakettle is greater than that of the housing 20 but it is provided with a smaller diameter base 72 which extends downwardly within the cylindrical portion of the distributor and retains it in position. The teakettle 70 is provided with the usual spout 74 and includes a handle 76 which has a dual function, as will be later described. The base of the teakettle or provided with an electrical heater 78 which connects to external prongs 80 for receiving an electrical plug of the type commonly employed, for example, with coffee makers. Mounted on the side of the teakettle 70 is a sight glass 82 which, by means of external markings, indicates the amount of water contained.

As previously mentioned, the handle 76 serves a dual function. When positioned as shown in FIG. 1 it is locked in place and serves as the usual handle for a teakettle permitting it to be lifted and poured. However, the handle also connects to an internal valve assembly 84. It will be noted form FIG. 2 that the top of the teakettle 70 is provided with the indicia "4", "8" and "12". When the handle is depressed and rotated so that it is aligned with one of these numbers, a corresponding number of cups of hot water is released through the bottom of the teakettle onto distributor plate 68.

The construction of valve assembly 84 is illustrated in FIG. 3. The valve comprises an outer sleeve 86 which may be slightly tapered as shown and extends through the teakettle from top to bottom. The upper and lower ends of the outer sleeve 86 are threaded and the upper end is retained within an opening in the teakettle top by means of an inner nut 88 and an outer nut 90. Outer nut 90 defines a recess within which is positioned a neoprene sealing gasket 92. The upper threaded end of the sleeve 86 extends above the outer nut 90 for a purpose to be described. The bottom of teakettle 70 is formed with an inwardly extending recess 94 which defines an opening through which the lower threaded portion of sleeve 86 extends. The lower portion is secured in the bottom of the teakettle in a similar fashion to the upper portion by means of an outer nut 96 within the recess and upper nut 98 and gasket 100. The lower end of the outer sleeve 86 is partially closed by a flange 102 which defines a water-releasing orifice 104.

The outer sleeve 86 also defines three vertically spaced apertures 106, 108, 110. In the described embodiment, the bottom of the upper aperture 106 is so positioned that, when the teakettle is filled with 12 cups of water, there are 4 cups above the bottom of the aperture. There are another 4 cups between the bottoms of apertures 106 and 108 and another 4 cups between the bottoms of apertures 108 and 110.

Positioned within the outer sleeve 86 is an inner sleeve 112 which has a matching taper. The inner sleeve is open at its lower end and is necked down at its upper end 114 to form circumferential should 116. The sleeve 112 defines apertures 118, 120, 122 which are in the same horizontal planes as apertures 106, 108, 110, respectively, but are spaced about the axis of the inner sleeve by 60° increments. The upper end 114 of the inner sleeve 112 also defines a cylindrical opening 124 having diametric keyways 126a, 126b, therein. The handle 76, which may be formed from plastic or other suitable material, is shaped at its end 128 to conform in cross section to the opening 124 and its associated keyways. The handle is thus vertically slidable relative to the inner sleeve but is nonrotatable with respect to such sleeve. A horizontal flange 130 on the handle 76 is biased upwardly from the upper end 114 of inner sleeve 112 by a coil spring 132, the handle being retained within the sleeve end by means of a cap nut 134. Cap nut 134 defines a central opening 136 for handle 76 which is substantially circular but includes a radial keyway 138. Molded on the top surface of flange 130 is a radial projection 140 which normally engages keyway 138 as a result of the upward bias supplied by spring 132. Although it will be understood that the valve may be secured in the teakettle in various ways, in the disclosed embodiment the top and bottom of the teakettle are separately formed. The valve is assembled to the two portions and they are thereafter interconnected by sealing seam 142 in any desired manner, such as by soldering.

In order to make coffee, the base 44 and fine filter 36 are connected to the glass housing 20 by inserting the bumps 32a, 32b through the corresponding notches in flange 40 and then rotating. This assembly is then placed upon the pot 10 as illustrated in FIG. 1. The coarse filter 52 is then inserted and thereafter the slide valve 56. The desired amount of ground coffee is next added so as to rest upon the conical base 44 within the coarse filter 52. The slide valve 56 is then adjusted to the proper position in accordance with the number of cups of coffee to be made. Thereafter, the distributor plate 68 is positioned in the open end of the housing 20.

The teakettle 70 is filled with the desired amount of water. Assume, for example, that 8 cups of coffee are desired, the teakettle is filled until sight gauge 82 indicates 12 cups of water. During this operation, the handle 76 is in the illustrated position and the projection 140 is seated within the keyway 138 by virtue of the action of spring 132. Thus the handle is locked so that the teakettle may be handled in the usual manner. It will also be noted that in this position the holes in inner sleeve 112 of the valve assembly 84 are not aligned with the holes in outer sleeve 86 so that water is contained solely within the teakettle 70.

The teakettle is next positioned atop the filter assembly 18 and an electrical plug is connected to the prongs 80 to heat the contained water. When the water has reached the boiling point, the proper amount is admitted into the filter assembly. This is accomplished by depressing the handle 76 against the force of spring 132 to release the projection 140 from keyway 138. The handle is next rotated clockwise, as shown in FIG. 2, to the desired position over the 8 cup indicia. In this position, aperture 120 in the inner sleeve 112 is aligned with aperture 108 in the outer sleeve so that the hot water in the teakettle 70 is permitted to escape through the inner sleeve 112 and orifice 104 onto distributor plate 68. From the distributor plate 68, the water drips downward onto the coffee bed and along the conical surface of the base 44 through the coarse and fine filters and into pot 10. It will be noted that the lower row of holes in each of the coarse and fine filters is positioned slightly above the outer limits of the base portion confined by each filter. This distance may be, for example, approximately one sixteenth inch and serves as a sediment trap.

Once the water has drained from the teakettle 70 to the lower edge of aperture 108, the handle 76 may be rotated back to its initial position, permitting the projection 140 to snap back into keyway 138 locking the handle into position. Thereafter, the teakettle may be removed and the remaining water employed as desired. It will also be noted by reference to FIG. 3 that the lowermost aperture 110 of the outer sleeve is positioned above the bottom of the teakettle. Accordingly, even if 12 cups of coffee are made, some water remains in the kettle 70 for the purpose of making tea.

It will be apparent to those skilled in the art that a number of variations and modifications may be made in this invention without departing from its spirit and scope. For example, valve assembly 84 is illustrated as comprising vertically aligned apertures in the outer sleeve and staggered apertures in the inner sleeve. This arrangement could, of course, be reversed with similar results. Also, the slide valve 56, although providing optimum performance, may be dispensed with, if desired. Other variations and modifications will readily suggest themselves to those skilled in the art. Accordingly, the foregoing description is to be construed as illustrative only rather than limiting.

What is claimed is:

1. A combination coffee maker and teakettle which comprises: a receptacle for brewed coffee; filter means positionable atop said receptacle for supporting ground coffee therein; and a teakettle positionable atop said filter means and including selectively adjustable valve means for releasing into said filter means one of several preselected quantities of hot water.

2. The article of claim 1 wherein said teakettle includes an electric heater therein.

3. The article of claim 1 wherein said teakettle includes a pouring spout and a handle and wherein said teakettle retains a quantity of water regardless of the preselected quantity of water released into said filter means.

4. The article of claim 1 wherein said valve means comprises: an outer sleeve extending between the top and bottom of said teakettle and defining at its lower end a water-releasing orifice; an inner sleeve rotatably mounted in said outer sleeve having an open lower end adjacent said orifice, said inner and outer sleeves defining pairs of openings, the openings of each pair being positioned at different levels within said teakettle and selectively alignable upon rotation of said inner sleeve; and means for rotating said inner sleeve.

5. The article of claim 4 wherein said rotating means comprises handle means secured to said inner sleeve and nonrotatable relative thereto.

6. The article of claim 5 wherein said handle means comprises: detent means normally positioning said inner sleeve with all of said opening pairs in nonaligned positions; and resilient biasing means operable by a user to release said detent means.

7. A combination coffee maker and teakettle which comprises: a receptacle for brewed coffee; filter means positionable atop said receptacle for supporting ground coffee therein; and a teakettle positionable atop said filter means and including valve means for releasing into said filter means a preselected quantity of hot water; said filter means including an outer housing having an open lower end positionable within said receptacle and a larger open upper end arranged to support said teakettle; a substantially cylindrical outer filter depending from said lower end; a convex base closing the lower end of said outer filter; and a substantially cylindrical inner filter extending upwardly from said base into said housing, said inner and outer filters being in sequential fluid flow relationship with water passing from said housing into said receptacle.

8. The article of claim 7 wherein said valve means is selectively adjustable to release one of several preselected quantities of hot water.

9. The article of claim 8 wherein said valve means comprises: an outer sleeve extending between the top and bottom of said teakettle and defining at its lower end a water-releasing orifice; an inner sleeve rotatably mounted in said outer sleeve having an open lower end adjacent said orifice, said inner and outer sleeves defining pairs of openings, the openings of each pair being positioned at different levels within said teakettle and selectively alignable upon rotation of said inner sleeve; and means for rotating said inner sleeve.

10. The article of claim 9 wherein said inner and outer sleeves have complementary conical tapers.

11. The article of claim 9 wherein said rotating means comprises handle means secured to said inner sleeve and nonrotatable relative thereto.

12. The article of claim 11 wherein said handle means comprises: detent means normally positioning said inner sleeve with all of said opening pairs in nonaligned positions; and resilient biasing means operable by a user to release said detent means.

* * * * *